United States Patent [19]
Côté et al.

[11] Patent Number: 5,502,268
[45] Date of Patent: Mar. 26, 1996

[54] METHOD FOR SEALING OF A MASS OF WASTE

[75] Inventors: Pierre L. Côté, Hamilton, Canada; Hans A. Van der Sloot, Callantsoog, Netherlands

[73] Assignee: Her Majesty the Queen in right of Canada, as represented by the Minister of the Environment, Canada

[21] Appl. No.: 50,010
[22] PCT Filed: Oct. 22, 1991
[86] PCT No.: PCT/NL91/00209
 § 371 Date: Apr. 22, 1993
 § 102(e) Date: Apr. 22, 1993
[87] PCT Pub. No.: WO92/06801
 PCT Pub. Date: Apr. 30, 1992

[30] Foreign Application Priority Data

Oct. 22, 1990 [CA] Canada .................................. 2028251

[51] Int. Cl.⁶ .............................. A62D 3/00; B09B 3/00
[52] U.S. Cl. ........................... 588/259; 405/129; 405/263; 588/249
[58] Field of Search ...................... 405/128, 129, 405/263, 266, 267, 52

[56] References Cited

U.S. PATENT DOCUMENTS 3,733,833 5/1973 Parks et al. .
4,615,643 10/1986 Gouvenot .
4,731,120 5/1988 Tuutti .
4,869,621 9/1989 McLaren et al. .
4,981,394 1/1991 McLaren et al. .
5,141,362 8/1992 Kugler .................................. 405/263 X
5,190,406 3/1993 Shannonhouse et al. .............. 405/129

FOREIGN PATENT DOCUMENTS 2000454 4/1990 Canada .

Primary Examiner—Dennis L. Taylor

[57] ABSTRACT

A new method for sealing off a mass of waste which comprises surrounding the mass of waste, stabilized waste or its placement side with a least one substantially continuous layer of porous material, the layer defining a substantially continuous, waste-encompassing interface, and providing a sufficient amount of an interactive reagent on either side of the interface for the reagent upon placement to diffuse towards each other and to form a precipitate filling the pores of the porous material substantially along the interface thereby forming a waste-encompassing layer of reduced permeability. The special benefit of this method is that after a rupture of the seal the interactive reagents form a new seal, thus preventing loss of noxious substances through the rupture.

22 Claims, 4 Drawing Sheets

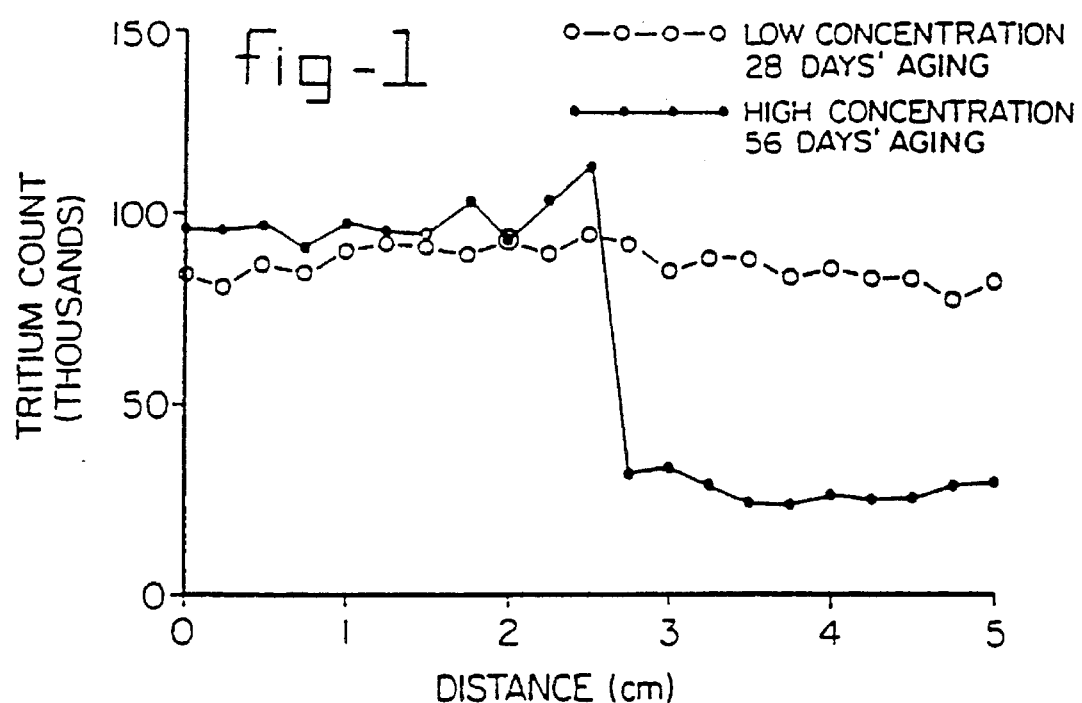
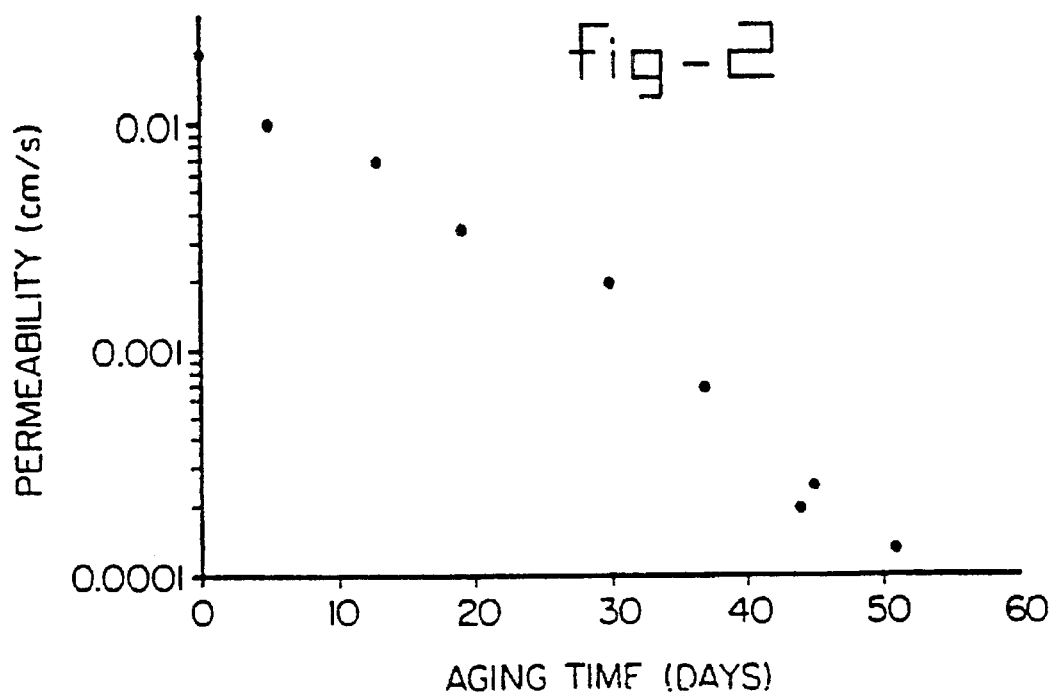

METHOD FOR SEALING OF A MASS OF WASTE

FIELD OF THE INVENTION

This invention relates to a process for the containment of waste that contain leachable quantities of hazardous constituents, and to barriers for containment of such wastes and construction materials containing wastes.

BACKGROUND OF THE INVENTION

Waste containment is a major engineering challenge. Both municipal and industrial wastes, if not properly contained or neutralized, can pollute the environment endangering public health via overland flow and via ground water diffusion of the leachable constituents. This also applies to reuse options for waste materials in construction applications such as road base and embankment.

Leachable contaminants can be isolated from the environment using a macro or micro-containment system.

In a macro-containment system, untreated wastes are surrounded by a liner to isolate the hazardous constituents from the environment. Liner systems (this term also includes covers) can either be constructed from synthetic materials, geotextiles, or from natural materials, i.e. low permeability clay or cementing mixtures. Both approaches have limitations. Synthetic liners are practically impervious but they are prone to puncturing when installed, or as a result of differential settling, and their life span in the ground is limited. Natural liners are more durable but they have a finite permeability. Furthermore, their permeability can increase upon contact with leachares. Neither macro-containment system is thus fully reliable for longterm disposal scenarios. The literature on the subject suggest that the life expectancy of synthetic membranes (liners, covers) is in the order of 50 years. This length of service can be extended indefinitely only when remedial measures (repair or replacement) are possible. This is, however, very difficult and expensive once the site is filled with waste material.

Micro-containment systems make use of precipitation/adsorption reactions to chemically immobilize hazardous constituents and often incorporate them in a solidified mass through the addition of various cementing additives. Resulting solid product can often be used in a construction. However, given the complex chemical nature of many waste materials, it is difficult to immobilize all contaminants. The result is that many solidified wastes must still be treated as materials requiring further containment. Furthermore, wastes treated by these methods are not available for future recovery if market or regulatory conditions make that desirable.

From EP-A2-0 390 297 a method is known for sealing off a mass of waste or stabilized waste which comprises:

surrounding the mass of waste, stabilized waste, on its emplacement site with at least one substantially continuous layer of porous material, the layer defining a substantially continuous, waste-encompassing interface. In that specification a cement containing mixture is provided on the waste material. During exposion to the environment the outer surface of the layer will harden. If because of some reason cracks occur in the impermeable hardened outer layer a fresh part of non-hardened material will be exposed to the environment and harden as yet providing in compensation for the cracks occurring.

U.S. Pat. No. 4,981,394 issued Jan. 1, 1991 to Mc Laren et al. and assigned to Terran teaches a composite of material upon or below the earth's surface and above the water table to prevent or effectively inhibit the flow of groundwaters through such layers of initially unconsolidated materials. Chemical components are added to materials such as incinerator ash or other waste materials deposited in a landfill operation to create alkaline conditions which, when contacted by water, induce precipitation of calcite in sufficient quantities to produce a cementing action which retards leachate formation. The patent further describes the preparation of a site as a landfill by choosing a site with alkaline soils or carbonate bedrock and adding appropriate chemical components to cause calcite to precipitate when contacted by water, which may be applied directly or by natural precipitation.

It appears from the patent that previously mixed components are used, or a site with alkaline soils is chosen.

U.S. Pat. No. 4,615,643 issued Oct. 7, 1986 to Gouvenot and assigned to Soletanche, France, proposes to seal off a mass of waste in soil by filling up hollows and cracks in the soil with a grout containing cement, clay, a siliceous product, sodium carbonate and alkali-metal tartrate. The grout would retain heavy metal cations that are leached from the mass of waste.

U.S. Pat. No. 4,726,710 to Rosar et al, Feb. 23, 1988 discloses a process for disposal of fossil fuel ash by adding there to sodium salts, preferably $Na_2SO_x$. The co-disposal renders the mixture of salt and ash impermeable.

U.S. Pat. No. 4,456,400 to Heide, et el. (Jun. 26, 1984) describes a process for disposing of waste materials by mixing them with brown coal ash and water to form a flowable pulp, hardenable to an impermeable material upon disposal.

U.S. Pat. No. 4,432,666 to Frey, et al, (Feb. 21, 1984) proposes to form a compact, water-repellent mass of waste by mixing the waste with a binder such as calcium hydroxide, gypsum or cement, followed by solidification, granulation, another mixing with binder and deposition of the pourable mixture in a repository to finish-harden therein.

As indicated hereinabove, one must assume that, realistically, any liner will fail during its lifetime. This applies to both synthetic membranes and to natural materials. Accordingly, there is still a need for a "self-healing" liner, one that will repair itself in situ when damaged.

SUMMARY OF THE INVENTION

According to the invention, there is provided a method for sealing off a mass of waste, or stabilized waste, which comprises surrounding the mass of waste, stabilized waste, or its emplacement site with at least one substantially continuous layer of porous material, the layer defining a substantially continuous, waste-encompassing interface, and providing an interreactive reagent on either side of the interface for the reagents upon placement to diffuse or migrate towards each other and to form a precipitate in the pores of said porous material substantially along said interface the amount of each reagent being at least such that the pores of said porous material are filled forming a waste-encompassing layer of reduced permeability at least 100× lower than that of the material before sealing or with a diffusivity of a solute through water-filled pores of the material of at least 10×lower than that before sealing.

The method of the invention can be used e.g. in materials (reuse), e.g. in a landfill, a lagoon tailings pond or natural waterbody by surrounding the waste with a self-sealing and self-healing, or selfrepairing liner of reduced permeability. Preferably, but not exclusively, "surrounding" in the context of this specification means encompassing the mass of waste from all sides thereby preventing both the ingress of water and the egress of any leachares or contaminants from the mass of waste. The liner is formed by a substantially continuous layer of a precipitate which forms in and fills the pores of a porous material, or matrix, surrounding the mass of waste. The invention further provides a self-sealing barrier system for sealing a mass of waste, stabilized waste or an emplacement site comprising:

a first homogenous and porous unreacted reactive reagent material, a second homogenous and porous unreacted reactive reagent material capable of reacting with said first material to form a precipitate in the pores of said porous material substantially along said interface the amount of each reagent being at least such that the pores of said porous material are filled forming a waste-encompassing layer of reduced permeability at least 100× lower than that of the material before sealing or with a diffusivity of a solute through water-filled pores of the material of at least 10× lower than that before sealing non-porous interface, and an intermediate non-porous barrier interface between said first and second reactive materials and comprised of reacted first and second materials, whereby said barrier system is effective for sealing said waste.

The present invention differs from the teachings of U.S. Pat. No. 4,981,394 in that there is a diffusion of two components from either side of the interface to form a precipitate in the pores of a porous material. It thus forms a distinct layer at the interface. A further aspect is that the diffusion of the present invention is intended to continue in the case that the sealed layer is fractured. This idea of self-healing properties is in no way suggested in U.S. Pat. No. 4,981,394.

The diffusion or migration mechanism constitutes a crucial part of the method. Unlike in prior art methods where reagents were premixed and usually reacted before placement in the site, the invention provides for a diffusion or migration of both reagents to the interface after placement. The amounts and types of reagents used must be sufficient to cause a concentration gradient and resultant diffusive transport to the interface and to form a layer of precipitate at said interface. Additional amounts of Peagents must be included to provide self-healing capacity. The control over the location and quality of the seal formed is an unique property of this invention.

Where the waste is known to contain and release in the site sufficient amounts of a compound suitable for forming an insoluble precipitate with another compound, it is only necessary to provide a layer of porous material containing and capable of releasing a sufficient amount of the other compound so as to effect, by way of diffusion of both components and resulting precipitation at an interface there between, a region of reduced permeability.

Where the waste material does not include sufficient amounts of suitable reagents, two or more layers of porous materials are emplaced and each provided with a sufficient amount of reagent capable of diffusing towards the adjacent second reagent and to react therewith to form a region of reduced permeability along a substantially continuous interface defined by the bodies of the adjacent reagents.

In this disclosure, the term "porous medium" means a material consisting of solid particles or a solid mass within which exist spaces, or "pores", unfilled by the solid. This disclosure concerns only those porous media wherein the pores are of a size and type sufficient to allow fluid flow and molecular diffusion. Examples of such porous media are: natural soils and soil material including clays, silts, sands, and gravels; soils and soil materials which have been sorted or otherwise modified for a particular engineering purpose, including sand-bentonite; porous solids including concrete, slags, and stabilized wastes; and granular and powdered waste materials including fly ashes and granulated slags.

In this disclosure, the term "fluid" refers to liquids including water, groundwater, soil water, industrial solutions, and waste leachares, and to gases. "Permeability" has the usual meaning according to Darcy's Law, and corresponds to the term "fluid conductivity" used in some disciplines. Under this definition, permeability is a material property of the porous medium, relating the velocity at which a fluid flows through the porous medium to the pressure gradient imposed on the fluid.

In this disclosure, the terms "molecular diffusion" and "diffusivity" have the usual meanings according to Fick's Law. Diffusivity is the property of a solvent in a solution or of a gas in another gas, relating its flux to its concentration gradient. This disclosure concerns only molecular diffusion such as it occurs in porous media. Examples of this process are the diffusion of hazardous solutes through the water-filled pores of a soil surrounding a waste disposal site, the diffusion of hazardous contaminants through the water-filled pores of a stabilized waste product, and the diffusion of gases through the air-filled pores of a soil covering a mine-waste disposal site.

The invention disclosed herein provides a barrier layer, or "liner", to reduce permeability and/or molecular diffusion through a porous medium.

There are a number of current practices where a liner of some type is applied. Examples of these applications include: as a "bottom liner" to prevent the release of leachates from waste disposal sites; as a "top cover" to prevent the influx of water to a waste disposal site; as a "vertical cutoff wall" to prevent the lateral migration of water and leachates in or out of a contaminated area; as a "capping layer" to prevent the release of contaminants from polluted sediments to the overlying water; as a bottom liner to prevent the loss of fluid or release of contaminants from liquid storage ponds; as a top cover to prevent water seepage into geotechnically sensitive areas, such as areas containing swelling clays or sinkholes; as a vertical or horizontal layer to restrict water flow around construction sites; as a "secondary protection system" to prevent the release of contaminants from buried storage tanks; and, as a top cover to reduce the movement of gases in and out of waste disposal sites.

Prior to this invention, liners for the above purposes were created by the following methods: compacting native or imported soil materials, such as sand-bentonite; applying soil pre-mixed with cementing materials, such as bentonite-cement; and, placing thin sheets of an impermeable plastic, such as high density polyethylene. These liner systems suffer from a number of weaknesses, the primary ones being that they are difficult and expensive to create in some circumstances, and that, if ruptured, they are impossible to repair without excavation of the surrounding material. Accordingly, there exists a need for a liner which is self-forming and self-repairing, such as is described in this disclosure.

The invention described herein also presents possibilities to improve existing liner systems and to apply liners in situations where they are not presently used. An example of the former possibility is the addition of self-repair capability to sand-bentonite and plastic liners. An example of the latter possibility is the sealing of porous stabilized wastes to prevent the outward diffusion of contaminants and the inward diffusion of chemicals which may attack the stabilized matrix.

The invention, thus provides a method for reducing fluid flow and/or molecular diffusion through a porous medium by means of a self-forming and self-repairing liner.

The liner consists of a substantially continuous region of the porous medium, in which a precipitate forms and fills the pores. The liner is obtained in the following steps:

(1) placing a substantially continuous layer of porous material, containing within its pores a reagent or consisting of and capable of releasing a reagent;

(2) placing a second substantially continuous layer of porous material containing within its pores or releasing a reagent which is capable of interreacting with that in the first layer to form a precipitate at a point or area in contact with the first layer;

(3) causing transport of the interreactive reagents towards each other, resulting in the precipitation of a pore-filling solid at or near the interface between the two layers.

The third step constitutes a distinctive part of the method. Unlike in prior art methods where reagents were premixed and at least partially reacted before placement in the site, the invention provides for transport of the interreactive reagents after placement. The transport of reagents towards each other may be caused by imposing fluid flow perpendicular to the interface. Alternatively, the amounts and types of reagents may be chosen to be sufficient to cause concentration gradients and resultant diffusive transport to the interface.

In order for the liner to be "self-forming", the amounts and types of reactants must be sufficient to substantially block the pores in the interface region, causing the desired reduction in permeability and molecular diffusion. Once the pores of the interface region are sufficiently blocked, further transport and contact of the interreactive reagents is prevented. If a subsequent rupture causes a new contact between the two layers, the precipitation and transport processes begin anew, leading eventually to "self-repairing" of the liner.

A modification to steps 1 and 2 above is possible when the site in which the liner will be formed or the material to be placed above the liner is known to contain and release in the site sufficient amounts of a reagent suitable for forming an insoluble precipitate with another reagent. In such cases, it is only necessary to provide a single layer of porous medium containing and capable of releasing a sufficient amount of the second reagent. Another modification involves repeating steps 1 and 2 above to form a sequence of layers, each of which contains in its pores a reagent interreactive with that of the adjacent layers. This situation may occur when the reagents compatible with the waste are not compatible with the environment (e.g. sealing of acidic wastes).

Further aspects of the invention will become apparent from the detailed description to follow.

BRIEF DESCRIPTION OF THE DRAWINGS

In the drawings:

FIG. 1 is a graph illustrating results of diffusion tests of a double precipitate sealing system using different concentrations of reagents and aging periods.

FIG. 2 illustrates results of permeability tests conducted on sample of beach sand sealed with a double precipitate liner, and FIGS. 3a and 3b are photographs of a perspex box containing a double precipitate seal obtained according to the inventions, wherein FIG. 3a shows the original seal and 3b shows the seal after puncture and resealing.

DETAILED DESCRIPTION AND PREFERRED EMBODIMENTS OF THE INVENTION

Figure 3A:
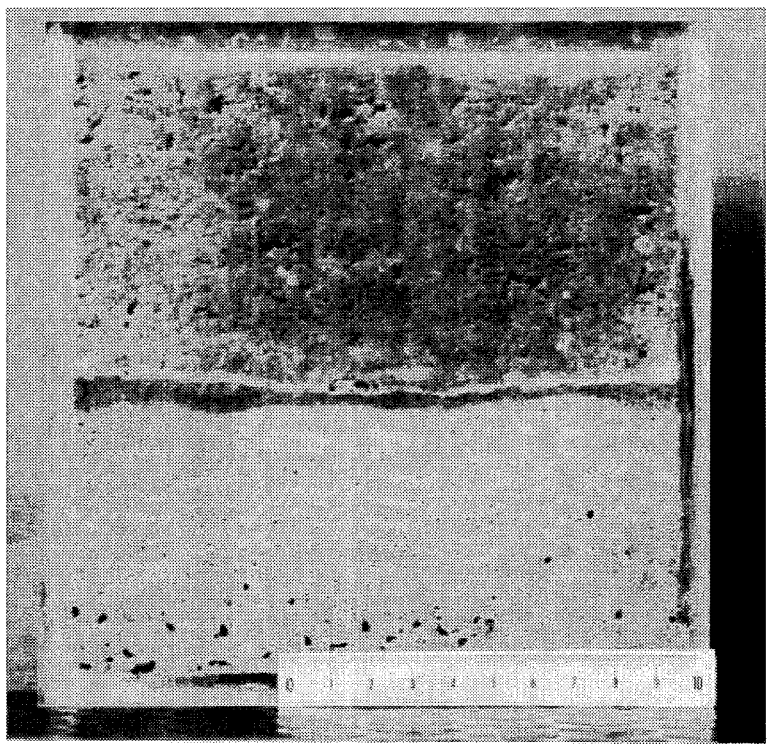

For the purposes of the disclosure, "diffusivity" has the usual meaning according to Fick's law. "Permeability" has the usual meaning according to Darcy's law for water flow and corresponds to the term "hydraulic conductivity" used in some disciplines.

In this specification, a material or layer or region of material is considered to be "of reduced permeability" if its permeability is at least 100× lower than that of the material before sealing or the diffusivity of a solute through water-filled pores of the material is at least 10× lower than that before sealing. This definition reflects to the two objectives of the invention, to reduce water flow through waste placements and to reduce contaminant diffusion out of waste placements.

For the sake of preferred embodiments, reference will be made to sand as the porous material. It is, however, conceivable to select a number of other materials. Where sand is referred to, it means a clean fine-grained industrial or natural sand.

In general terms, the invention provides a liner for a waste disposal or reuse site, the liner being a region of reduced permeability formed in-situ after a layer of porous material and a pair (or more) of interreactive reagent in or adjacent to the layer have been emplaced to surround the waste disposal site, the reagents being placed on opposite sides of an imaginary interface.

The process by which the liner forms in-situ is as follows. The interreactive reagents in the adjacent layers dissolve into the pore water. At the interface between the two layers, the aqueous reagents meet and react to form one or more solid precipitates. Local aqueous concentrations of the interreactive reagents are reduced by the precipitation reaction, leading to aqueous concentration gradients. In response to these gradients, diffusion processes transport more interreactive reagents through the pore water to the interface where they precipitate to form more solid. In some cases, the transport of reagents occurring by diffusion may be accelerated or complimented by low water flow perpendicular to the interface. The transport processes continue until the precipitate substantially blocks the pores of the matrix and thereby halts further diffusion. This process is herein referred to as self-forming.

The amount of interreactive reagents provided should be greater than the amounts needed to form the liner. The excess amounts are held in reserve, unable to react because of the pore blockage, until the liner fails. Once the original liner is ruptured, a path is opened through which the excess interreactive reagents can diffuse and form new precipitate. The process described above then begins anew and continues until the pores in the ruptured region are blocked. This process is referred to as self-healing.

While it is conceivable to layer the hair of reactive chemicals in previously placed or existing media of a site already containing waste, it is easier to prepare the layer(s) before the waste is dumped into the site.

Normally, at least one pair of interreactive compounds is placed, according to the invention, in two or more layers of porous media. A practical way of accomplishing this goal is to place one layer of porous medium, say sand, to which one of the reagents has been added, over the bottom and walls of the site, and overlay the first layer with another sand layer to which the second reagent has been added. If the site itself releases one of the reagents, or if material to be placed above the liner is expected to release one of the reagents, the invention requires that only one layer of porous medium, containing the second reagent, be placed.

If the waste does not contain or does not release suitable reactive compounds in sufficient concentrations, at least one pair of interreactive compounds is emplaced, according to the invention, in two or more layers of sand. A practical way of accomplishing this goal is to place one layer of sand containing, say, chemical A, over the bottom and walls of the dump site, and overlay the first layer with another sand layer containing chemical B. Next, waste is placed in the side and the sand layers are placed on top of the waste, if desired, so as to form a continuation of the former liner. This geometry naturally defines the reagent interface as a border between two sand layers.

The interreactive reagents may be added either as aqueous species or as solids. Since the total concentration of reagents must be sufficient to allow both self-sealing and self-healing, aqueous species are best addes as strong salts, strong acids, or strong bases. The embodiment using these strongly soluble reagents is herein referred to as the "soluble salts" method. An example of this embodiment is the use of $Na_2CO_3$ solution an one side of the imaginary boundary and $CaCl_2$ solution on the other side. In that case, a $CaCO_3$ precipitate forms at the interface. When interreactive reagents are added as soluble solids. sufficient amounts can be added more easily. In this embodiment, referred to herein as the "double precipitate" method, the solids are selected so that they dissolve and thereby release ions capable of reacting to form two new solids of lower solubility. An example of this embodiment is the use of $Ca(OH)_2$ on one side of the interface and $MgCO_3$ on the other side. In this case, $CaCO_3$ and $Mg(OH)_2$ precipitate at the interface.

The choice between soluble salts and double precipitate methods should be based on the specific requirements of the waste disposal system. The double precipitate method has a number of advantages. First, all the interreactive reagents can ultimately be transformed to liner, i.e. no counter-ions remain. In contrast, the high concentrations counter-ion produced when soluble salts are used may interfere with liner formation. Furthermore, these counter-ions would themselves be considered a contamination problem in many scenarios. A second advantage of the double precipitate method is that, since the reagents are added as solids, solubility problems do not limit the amount used. This advantage implies that the length of the region containing each reagent can be much less than would be needed to create a similar liner from soluble salts. A third advantage of the double precipitate method is that the release of reagents is controlled by dissolution of the original solids. This control implies that the reagents cannot be rapidly lost through the unsealed end of the liner, as may happen if soluble salts were used. The dissolution control also insures that the ions never reach high concentrations and are therefore more likely to form well-ordered, stable precipitates. The soluble salts method has one advantage. Since the amount of reagent in solution is not limited by solubility, self sealing is usually faster.

Where the waste is found to contain sufficients amounts of a suitable reagent, e.g. $Ca(OH)_2$ which is likely to leach from the waste, it is possible to apply one of the embodiments of the invention by placing one layer of sand containing the second interreactive reagent, e.g. $MgCO_3$ beneath the designed waste dump site. In this embodiment, the interface will be created at the surface of the sand layer on which the waste is placed, and precipitation reactions will fill the pores, e.g. with $CaCO_3$ and $Mg(OH)_2$.

For each specific application of the invention, the choice interreactive reagents must insure maximum chemical compatibility between the liner and its surroundings. For example, it is preferable that the precipitate formed at the interface be chemically resistant to leachate from waste and to groundwater. In some cases, it may be necessary or desirable to add more than one pair of reagents to adjacent layers.

The number of layers is not limited. It is only necessary that each layer contain or release suitable reagent capable of diffusing and forming an adequate precipitate with the adjacent reagent. In some cases, combination of the soluble salts and double precipitate methods with the method using reagents from the waste are desirable in order to obtain specific advantages of individual methods and/or to minimize costs.

The thickness of the layers is dictated by a number of factors, including the concentrations of reagents, their diffusivity, the permeability of the precipitate formed, and the expected magnitude of ruptures. It is desirable that the layers be at least thick enough that, after rupture, interreactive reagents would still be adjacent.

It is preferable that the precipitate formed at the interface be chemically resistant to leachate from the waste and to groundwater. For each specific application of the invention, the choice of interreactive reagents must insure maximum compatibility between the liner and its surroundings. It is also preferable that the porous material in each layer be chemically resistant to leachate from the waste it surrounds and to the interreactive reagents used. Sand is an obvious choice because of its low chemical reactivity.

It is preferable that the porous material in each layer be chemically inert to the interreactive reagents. Beyond that constraint, the choice of porous medium will largely be determined by particulars of the application. For example it is convenient to use locally available soil materials for bottom liners, top covers, and cutoff walls at waste disposal sites. Sediment capping layers need to be sufficiently coarse grained that they will not be disturbed by bottom currents. Seepage control in geotechnically sensitive areas requires that a large surface be sealed, necessitating the use of local soils. For some applications, it may prove economical to transport desirable porous media, such as inert sands, to a site where they can be premixed with the interreactive reagents, and then transport the mixed components for placement in layers at the application site.

When the invention is used to add self-repair capability to other liner systems, the choice of porous media is clear. For example, to add self-repair capability to a sand-bentonite liner, reagent A would be added to one layer of sand-bentonite and reactant B to an adjacent layer. Similarly, to add self-repair capability to a plastic liner, reactant A would be added to the porous medium (normally a sand) above the plastic sheet and reactant B to the medium below the plastic sheet. The choice of porous medium is also pre-determined when the invention is used to seal an porous solid such as a stabilized waste. In that case the sealing reaction takes place in the pores of the solid itself.

EXPERIMENTAL PROCEDURES AND RESULTS

A number of experiments have been conducted at facilities located at the Netherlands Energy Research Foundation (ECN) and at McMaster University. The following examples describe experiments used to validate the invention by demonstrating that layers of reduced permeability can be formed, that self-repair occurs upon rupture, and that the processes referred to in the invention are subject to control, making them suitable for technological application.

For clarity, the examples treated in detail in this section refer consistently to the testing of "double precipitate" seals. As is discussed at the end of each example, similar experiments have been conducted on other seal-forming systems.

EXAMPLE 1

Double precipitate liner in a diffusion tube

The objective of this experiment was to use two slightly soluble interreactive reagents, $Ca(OH)_2$ and $MgCO_3$, to form "double precipitate" interface seals, consisting of $CaCO_3$ and $Mg(OH)_2$, and to determine the effects of reagent concentration and aging time on the quality of the scal. $Ca(OH)_2$ and freshly precipitated $MgCO_3$ were mixed at low, medium and high concentrations with a fine-grained beach sand. The low concentration was 0.025 mMoles/g. The medium concentration was 0.250 mMoles/g. The high concentration was 1.250 mMoles/g. Water was then added to the $Ca(OH)_2$-sand and $MgCO_3$-sand mixtures to form thick pastes. Diffusion tubes were prepared by cutting 1 cm diameter plastic tubing to lengths of 10 cm. The $Ca(OH)_2$ pastes were then packet into one half of each diffusion tube. $MgCO_3$ paste was packed into the other half of each diffusion tube. The low, medium and high concentration $MgCO_3$ pastes were packed against respective concentrations of the $Ca(OH)_2$ pastes. The diffusion tubes were then aged in such a manner that the $MgCO_3$ end of each tube was always in contact with a saturated $MgCO_3$ solution and the $Ca(OH)_2$ end of each tube was always in contact with a saturated $Ca(OH)_2$ solution. Two rubes of each concentration were aged for each of 7 days, 14 days, 28 days and 56 days. At the end of the specified aging time, a drop of radioactive tritium was placed on one end of each tube. The tritium was allowed to diffuse into the tubes for 7 days. The tubes were then extruded and the contents sliced into this sections and analyzed for tritium by x-ray diffraction analysis. The results of the tritium analyses were plotted against the position of each slice to generate a tritium profile. By analyzing this tritium profile, it was possible to determine if the tritium diffusion had been impeded by a layer of reduced permeability formed at the interface of the $MgCO_3$ and $Ca(OH)_2$ pastes The results of this experiment can be summarized as follows:

(1) the low concentration interreactive reagents formed no effective seal, even after 56 days aging;

(2) the medium concentration tubes formed no seal after 7 days, a poor seal after 14 and 28 days, and a moderate seal after 56 days aging;

(3) the high concentration reagents formed a poor seal after 7 days, a moderate seal after 14 and 28 days, and a good seal after 56 days aging.

The dashed line in FIG. 1 shows a result from the low concentration, 28-day test in a unsealed tube. In this case, the tritium profile is smooth, indicating that tritium diffusion was not impeded. The solid line in FIG. 1 shows a result form the high concentration, 56-day test in a tube with a good seal. In this case, the tritium profile exhibits a sharp discontinuity near the middle of the tube, indicating that diffusion of tritium through the interface region was hindered. Comparison of this profile to mathematical predictions shows that the diffusivity across the interface region was more dan 10× lower than that of the $MgCO_3$ or $Ca(OH)_2$ pastes. Therefore, this region is one of reduced permeability, as defined above.

It is apparent that a threshold minimum amount of material must be provided in order to form a seal. The low concentrations used were below this threshold. At the medium and high concentrations, seals did form but their quality was strongly dependent on aging time and concentration. The results suggest indicate that the sealing process is subject to external control, as required for practical applications of the process.

Diffusion tube methods similar to those described above have been used to test a number of seals. In some cases, the tritium tracer was replaced by a radioactive sodium isotope or by lithium. These tracers are all more mobile than most contaminants and they therefore provide conservative tests of seal performance. In addition to the above system, seals meeting the diffusivity criteria for reduced permeability have been created using the following combinations;

(1) $CaCl_2$ solution in fine sand vs. $K_2CO_3$ solution in fine sand to form a single precipitate $CaCO_3$ seal;

(2) $FeCl_3$ solution in fine sand vs. an industrial waste slag obtained from Algoma to form an $Fe(OH)_3$ precipitate;

(3) $K_2HPO_4$ solution in sand vs. $Ca(NO_3)$. solution in sand to form a single precipitate $Ca_3(PO_4)_2$ seal;

(4) $K_2CO_3$ solution in sand vs. $Ca(NO_3)_2$ solution in sand to form a single precipitate $CaCO_3$ seal.

EXAMPLE 2

Permeability testing of the double precipitate seal

The objective of this experiment was to determine whether the double precipitate seal described above met the permeability requirements for regions of reduced permeability. A fixed-wall permeameter, 5 cm in diameter and 14 cm long, was packed with $Ca(OH)_2$-sand and $MgCO_3$-sand pastes (beach sand) prepared as described above. The cell was aged for 51 days and periodically tested using conventional fixed-wall permeability methods. After the last test, the contents of the cell were extruded and sliced. Samples retrieved from the hardened interface layer were lightly crushed, sieved to remove sand grains, and submitted for X-ray diffraction analysis.

Results of the permeability tests are shown in FIG. 2. The sample exhibited a log-linear decrease in permeability over time. Previous tests indicated that the permeability of the sand, without a seal, was approximately 0.02 cm/s. The final measured permeability is more than 100×lower than the original value. Therefore, this system exhibits reduced permeability, as defined above. This interpretation assumes that the decrease in permeability occurred across the entire 14 cm length of the cell. In fact, as shown by the later slicing of the cell, the hardened interface layer was only approximately 1–2 mm thick. If the observed reduction in permeability is ascribed to this region alone, the reduction is approximately 1000×.

The X-ray diffraction analysis identified two precipitates in the interface region, $CaCO_3$ and $Mg(OH)_2$. The formation of these precipitates from the interreactive reagents is consistent with chemical thermodynamics. The log-linear decrease in permeability is consistent with control by diffusive transport processes. The slope of the curve indicates that after 51 days the final permeability of the seal has not yet been reached. Technical limitations exist to properly determine the permeability of these liner systems with the existing "state of the art" equipment. Hence, these results provide strong support for the conceptual picture of liner formation presented above.

Tests using the permeability cell have also indicated that layers of reduced permeability are formed in the following systems:

(1) $MgSO_4$ in sand vs. $Ca(OH)_2$ in sand to form a double precipitate seal of $CaSO_4*nH_2O$ and $Mg(OH)_2$;

(2) Multiple layers of $MgCO_3$ in sand vs. $Ca(OH)_2$ in sand to form multiple double precipitate seals, each consisting of $CaCO_3$ and $Mg(OH)_2$;

(3) $K_2HPO_4$ solution in sand vs. $Ca(NO_3)_2$ solution in sand to form a single precipitate $Ca_3(PO_4)_2$ seal;

(4) $K_2CO_3$ solution in sand vs. $Ca(NO_3)_2$ solution in sand to form a single precipitate $CaCO_3$ seal.

A simpler method of permeability testing has also been used wherein the unsealed material is washed away from the interface using demineralized water and water is then ponded on top of the interface. The results of this method are not quantitative but they have indicated permeability reductions for the following systems:

(1) 100% $MgSO_4$ vs. 100% $Ca(OH)_2$ to form a double precipitate seal of $CaSO_4*nH_2O$ and $Mg(OH)_2$;

(2) $MgCO_2$ and/or $MgSO_4$ in sand vs. steel slag obtained from Hoogovens, Netherlands to form a single precipitate $CaCO_3$ and/or $CaSO_4$ seal.

EXAMPLE 3

Dye testing of double precipitate seal

The objective of this experiment was to provide a visible demonstration of seal effectiveness and a test of the self-sealing process described above. A Perspex box measuring about 15×15×3 cm was filled with beach sand containing milky suspensions of the two interreactive reagents. The box and contents were aged for 2 weeks, during which grey and white bands were observed to form at the interface.

Tartrazine yellow dye was placed on the top of the box after the two weeks aging. It diffused through the media and stopped at the interface. A photo taken two weeks after the dye application is shown in FIG. 3a. The sharp change in colour at the interface clearly shows that the dye was not able to penetrate the interface.

Figure 3B:
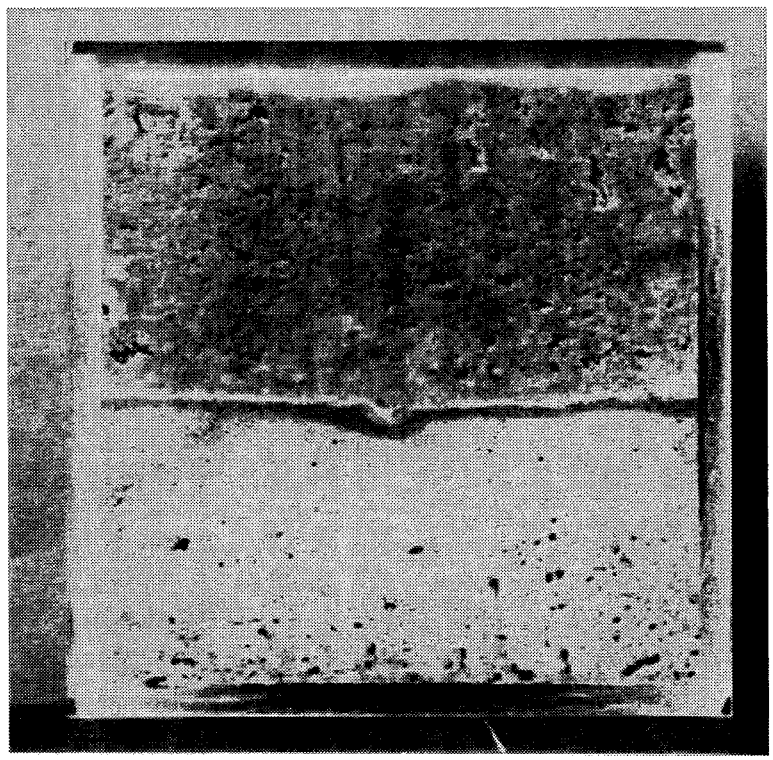
Figure 4C:
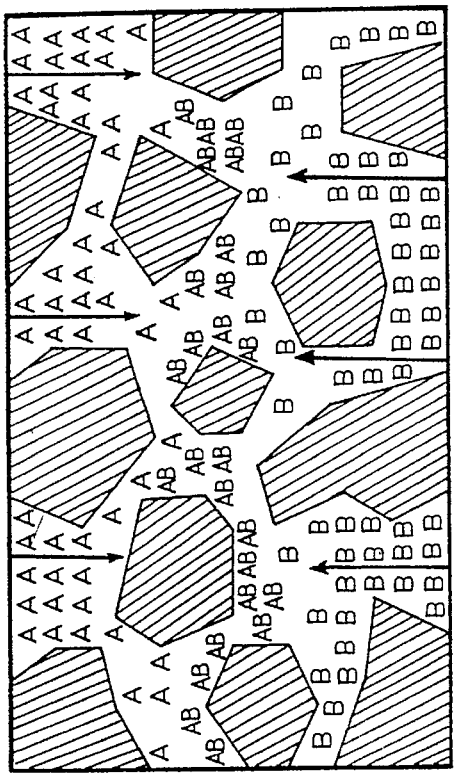
FIGS. 4a–4d are microscopic views of self-forming.
Figure 4D:
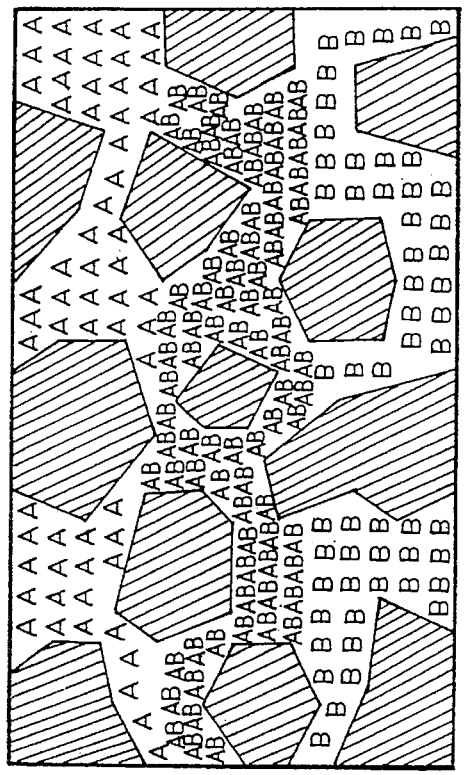
Figure 4A:
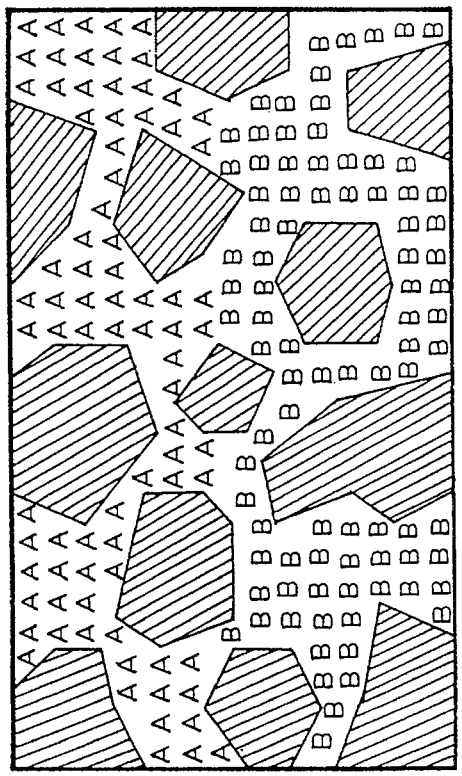
Figure 4B:
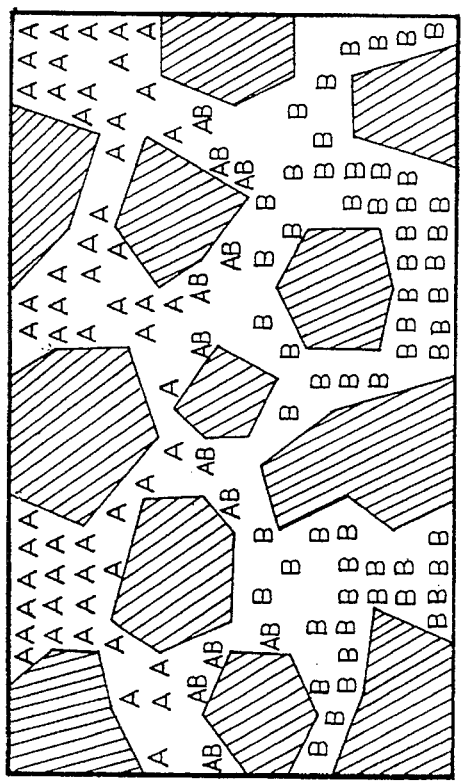
Figure 5C:
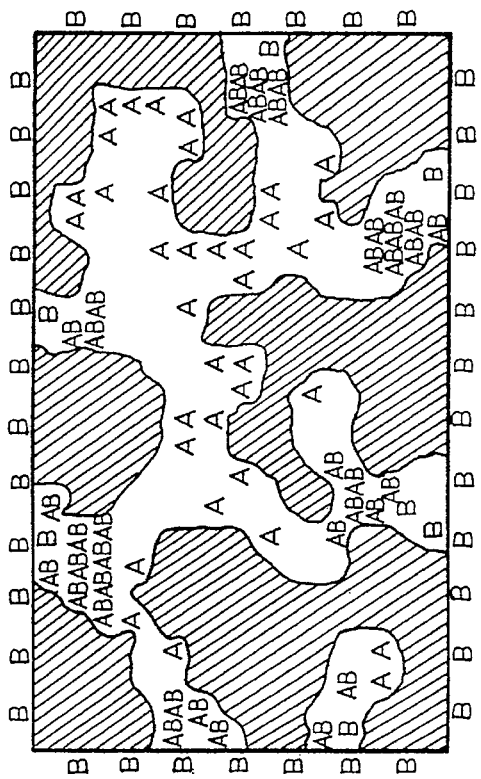
FIGS. 5a–5d show the application of seal in porous solid.
Figure 5D:
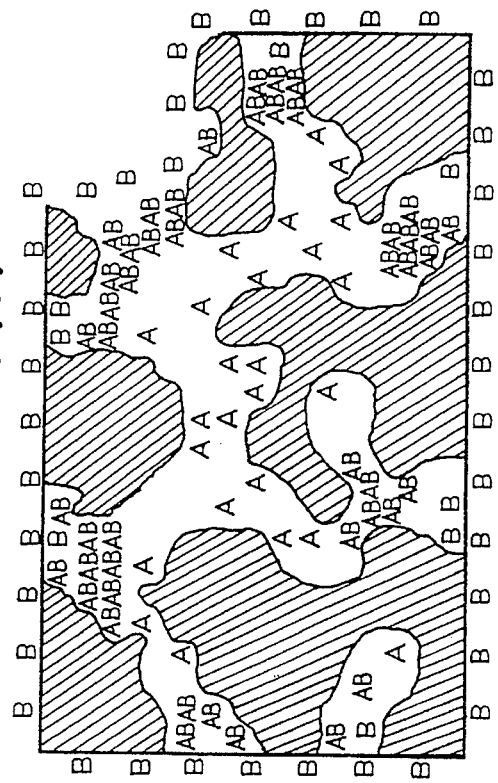
Figure 5A:
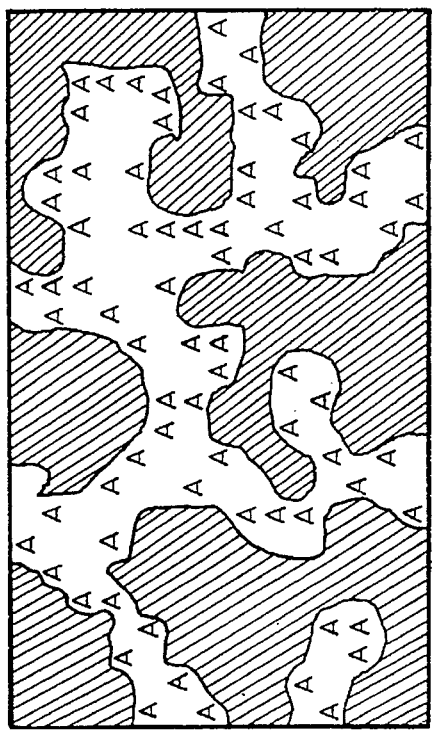
Figure 5B:
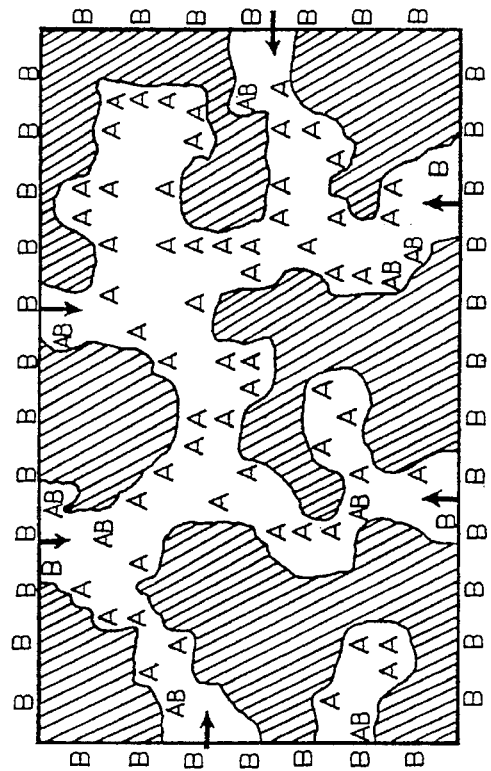

To demonstrate self-forming, the interface was punctured with a spatula. Dye penetrated the punctured area for about one day. The second photo in FIG. 3b shows conditions one week after the puncture. The dye in the punctured are did not move any further into the lower half of the box, indicating that the liner had effectively resealed itself.

FIGS. 4a–4d gives a microscopic view of self-forming. (a) Reagents A and B in porous matrix. (b) Precipitation of solid AB lowers local concentration of reagents. (c) Diffusion supplies more reagent to precipitation sites. (d) Precipitate completely fills pores and self-forming stops.

FIGS. 5a–5d shows the application of seal in porous solid. (a) Solidified waste block with unreacted material A. (b) Contact with environment containing reagent B. (c) Precipitation of solid AB causes sealing of pores. (d) Seal forms in pores opened by fracture of block.

The above type of experiment has been used to test other systems. In some cases, dimensions of the box were different and the tartrazine yellow dye was replaced by dextran blue or potassium permanganate. In addition to the above results, successful sealing has been observed with the following combinations of materials:

(1) $Ca(OH)_2$ in sand vs. $MgSO_4$ in sand to form double precipitate seal consisting of $CaSO_4*nH_2O$ and $Mg(OH)_2$;

(2) $CaCl_2$ solution in fine sand vs. $Na_2CO_3$ solution in fine sand to form a single precipitate $CaCO_3$ seal;

(3) $CaCl_2$ solution in fine sand vs. $K_2HPO_4$ solution in fine sand to form an unidentified calcium phosphate or apatite seal.

EXAMPLE 4

Larger scale testing of double precipitate seals

The objective of this experiment was to show that layers of reduced permeability could be formed at larger scales. The experiment was conducted at the ECN tracer field in three cylindrical vats, each measuring 80 cm in diameter and 120 cm in height. A drainage layer, consisting 30 cm of water-saturated gravel was placed into the bottom of each vat. A 50 cm layer of water-saturated sand was then placed into the first vat, hereafter referred to as the control vat. A 20 cm layer of water-saturated sand was placed into the other two vats, followed by two 10 cm layers of water-saturated sand to which interreactive reagents had been added, and by an 10 cm protective layer of water-saturated sand. The reactive components were $Ca(OH)_a$ in one layer and a combination of $MgCO_3$ and $MgSO_4$ in the other layer.

After approximately three weeks, tartrazine yellow dye was added to the surface of the control vat and to two of the vats containing reactive components. After four weeks, water samples withdrawn from the bottom, layer of the control vat were distinctly yellow, indicating that the dye had diffused through the sand. Water samples withdrawn from the gravel layer of the two vats containing interreactive reagents showed no yellow coloration, indicating that a layer of reduced permeability had impeded diffusion of the dye in those vats. After a total of weeks, the three vats were sampled by means of a core-sampling device, pressed through the sand layers. The cores from each vat were withdrawn and examined. The core from the control vat was uniformly yellow, indicating complete diffusion of the dye throughout the vat. The cores from the two vats containing interreactive reagents showed a uniformly yellow region above the layer of reduced permeability and a region with no yellow colour below, indicating that the dye was effectively stopped by the sealed layer. Spectrophotometric analysis of samples taken from the cores confirmed that no dye was detectable below the sealed layers. XRD analysis of samples from the sealed layer indicated the presence of $CaCO_3$ and $CaSO_4*2H_2O$ precipitates. XRD analysis of samples from above and below the sealed layer detected residual interreactive reagents, indicating a potential for self-repair. Sampling the liner vat with a core sampling device 10 month after seal formation has shown no indications of dye present below the seal.

Larger scale studies have also indicated the presence of layers of reduced permeability in the following systems:

(1) $Ca(OH)_2$ in sand vs. $MgCO_3$ and $MgSO_4$ in sand as tested in 80 cm diameter vats over periods up to one year;

(2) $CaCl_2$ in sand vs. $NaCO_3$ in sand tested in 20 L plastic bottles;

(3) $CaCl_2$ in sand vs. $K_{2\,HPO_4}$ in sand tested in 20 L plastic bottles;

(4) Ca(NO$_3$)$_2$ in sand vs. K$_2$CO$_3$ in sand tested in 20 L plastic bottles;

(5) Ca(NO$_3$)$_2$ in sand vs. K$_2$HPO$_4$ in sand tested in 20 L plastic bottles;

(6) Ca(OH)$_2$ in sand vs. MgCO$_3$.Mg(OH)$_2$ in sand tested in 20 L plastic bottles.

Tests in 80 cm vats with a trip mechanism to cause fracture of the sealed layer indicated that the combination of Ca(OH)$_2$ in sand vs. MgCO$_3$ and MgSO$_4$ in sand was capable of repairing itself after significant deformation. Similar results were obtained in self-repair tests of other reagent combinations in 20-liter plastic bottles.

Experiments at even larger scales were begun in August of 1991 at the ECN tracer field. Layers of drainage material, sand, and sand containing interreactive reagents were placed in specially-constructed boxes measuring 2.4 m square and 1.2 m high. The boxes were fitted with a number of monitoring and sampling devices. Early results from these experiments indicate that layers of reduced permeability can be formed at this scale.

EXPERIMENTS TO DEMONSTRATE AND TEST APPLICATIONS OF THE INVENTION

Experiments have also been conducted to demonstrate and test potential applications of the invention to particular problems. The following examples are illustrative rather than exclusive.

EXAMPLE 5

Application as a bottom liner for waste disposal or reuse sites

An experiment was carried out in the ECN laboratory to evaluate the effectiveness of a liner formed from Ca(OH)$_2$ in sand vs. MgCO$_3$ and MgSO$_4$ in sand as a bottom liner for disposal of air pollution control residues generated municipal solid waste (MSW) incinerators. One 5-liter beaker was filled with MSWI residue and the two layers of the liner recipe were added. A control beaker was filled with MSWI residue and sand layers containing no reagents. A layer of water was then added to each beaker. Analysis of samples taken at various intervals from the water layers of both beakers indicated at least a 10 times lower rate of release of K and Cl from the MSWI residues under the liner in comparison with the control.

An experiment was carried out in the ECN tracer field to evaluate the effectiveness of a liner formed from Ca(OH)$_2$ in sand vs. MgCO$_3$ and MgSO$_4$ in sand as a bottom liner for disposal of an acidic coal fly ash. Gravel drainage and sand layers were added to each of two 80-cm diameter vats. The two layer of the liner recipe were then added to one of the vats. Layers of sand containing no reagents were added to the second, control vat. A layer of acidic coal ash was then added to each vat. Analysis of samples taken from the drainage layers of both vats indicated at least a 20 times lower rate of release of B from the coal ash above the liner in comparison with the control.

In an experiment carried out at the ECN laboratory, the one-layer method was used to form a liner around fine-grained steel slag. The calcium hydroxide phases in the slag served as one of the reagents. The second layer consisted of sand mixed with MgCO$_3$ and MgSO$_4$. In dye diffusion tests similar to those described above, no dye penetrated the interface between the two layers. Tracer experiments with Na-22 in diffusion tube measurements confirmed that a seal was formed.

An experiment was carried out at the McMaster laboratory to evaluate the effect of a lithium-spiked leachate from a cement-solidified chrome plating sludge, containing high levels of chloride, on the seal formed by reaction of CaCl$_2$ and K$_2$HPO$_4$. Single, double and quadruple seals were formed in diffusion tubes, as described earlier, and exposed to the leachate as a tracer. Slicing and analysis of the tubes after 2 days of tracer diffusion time yielded profiles indicating that both chloride and lithium were retained by the seals formed.

An experiment was conducted at the McMaster laboratory in which single double-precipitate seals were formed in 200-ml glass bottles, in the presence of 2.25M NaCl. When tested with the leachate from the solidified chrome plating sludge, these systems were found to retain both chloride and lithium.

The ability of a seal to heal itself in the presence of waste leachates was shown in a variety of experiments in the McMaster laboratory. Double seals of soluble salt systems (K$_2$HPO$_4$ and Ca(NO$_3$)$_2$ and K$_2$CO$_3$ and Ca(NO$_3$)$_2$) were formed in 200 ml bottles in the presence of representative interferences potentially present in waste leachates: citrate, dichromate and phenol. After an incubation time of 8 days, a tracer consisting of a solution containing copper, lead, cadmium and lithium was applied for a diffusion time of 12 days. Slicing and analysis of cores showed all of the contaminants to be retained by the seals formed in the presence of the interferences.

An experiment was conducted to examine the ability of a barrier to form under the reducing conditions encountered in some wastes, the soluble salt seals and the double-precipitate seal were also formed and tested in the presence of 0.01 M Na$_2$SO$_3$. A solution of copper, lead, cadmium and lithium was applied as a tracer. Analysis of core slices showed that the tracer solution was retained.

EXAMPLE 6

Application as a top cover for waste disposal/reuse sites or for infiltration control An experiment was conducted at the ECN laboratory in two aquaria measuring approximately 30×20×20 cm to test the potential for the invention to be used as a top cover to prevent water infiltration into waste disposal or reuse sites. Drainage layers of gravel and sand were first added to each aquarium, followed by layers of Ca(OH)$_2$ in sand. A layer of sand containing MgCO$_3$ and MgSO$_4$ was then added to one aquarium. A layer of sand containing only MgCO$_3$ was added to the other. A number of times during the experiment, water containing yellow dye was added to the top of each aquarium. The dye permitted the infiltration pattern to be directly observed. In tests after a short aging period, some penetration of dye through the MgCO$_3$ liner was observed. In later tests of the MgCO$_3$ liner and in all tests of the MgSO$_4$+MgCO$_3$ liner, the water did not penetrate the interface but was instead diverted to the sides of the aquaria (small effects).

In an experiment conducted at the ECN tracer field in 80-cm diameter vats, a layer of MgSO$_4$ mixed with dry sand was placed above a layer of Ca(OH)$_2$ mixed with dry sand. Water was then added to the surface and allowed to infiltrate downwards. When the water reached the interface between the two layers, precipitation reactions occurred. After three days of aging and periodic water additions, the water was no longer able to penetrate the interface. Apparently the flow of water perpendicular to the interface accelerated the sealing process. The interface was subsequently punctured with a sharp rod. Self-repair was observed through a window in the side of the vat.

Experiments done in the McMaster laboratory included examination of the effect of freezing on the soluble salt and double precipitate seals. Surface drying was shown not to affect the integrity of a previously formed seal.

EXAMPLE 7

Application as a vertical cutoff wall or for seepage control

In an experiment carried out at the ECN laboratory, a perspex box measuring approximately 30×5×20 cm was filled with sand, leaving a vertical hole approximately 5 cm wide. A perspex plate was inserted into the hole to divided it in half vertically. Sand containing $Ca(OH)_2$ was added to one half of the hole and sand containing $MgSO_4$ was added to the other half. The perspex plate was slowly withdrawn as the hole was filled, allowing the two sand-reagent mixes to form a vertical contact interface. Precipitation was observed at the interface.

A similar method was used to form a vertical contact interface between $Ca(OH)_2$ in sand and $MgCO_3$ with $MgSO_4$ in sand. In this experiment a radial geometry was used to allow a later diffusion test. Precipitation was observed at the interface between the two sand reagent mixes. A dye injected on one side of the vertical interface did not penetrate to the other side. After the dye test, this experiment was carefully dissected and the vertical wall removed. The vertical wall was observed to be of variable thickness, ranging from a few millimeters to 1.5 centimeters, and consisted of sand cemented with $CaSO_4$ and $CaCO_3$ precipitates.

EXAMPLE 8

Application as a cap for contaminated sediment

In an experiment conducted at the ECN laboratory, contaminated river sediments were covered with two layers of the reagents, $Fe(II)SO_4$ and $Ca(OH)_2$ respectively, in sand. The layer containing Fe(II) was placed directly on top of the sediment. The Fe(II) was oxidized to Fe(III) and precipitated as an iron hydroxide phase which acted as a seal and sorbent for metals. The Ca reacted with the sulphate to form a stable $CaSO_4$ liner. The $Ca(OH)_2$ exposed to the water layer was rapidly carbonated to form a secondary seal on the side of the liner exposed to the water phase.

EXAMPLE 9

Application as a liner for liquid storage ponds

In an experiment conducted at the ECN laboratory, the potential of the invention as a liner for a cyanide storage pond, as used in the mining industry, was tested. Using a method similar to the diffusion tube method described above, 1-cm diameter tubes filled with layers of sand and reagents and left standing for 14 days to form seals. A concentrated NaCN solution with pH=10 was then placed onto one end of the tubes. After 24 more days, sufficient for the cyanide to diffuse through an unsealed tube of similar length, the sealed tubes were extruded, sliced and analyzed for CN-. No CN- was detected directly on the other side of either tube, indicating that the seal was effective in stopping CN- diffusion.

EXAMPLE 10

Application as an additive to sand-bentonite liners

An experiment was conducted at the ECN laboratory two 30×5×20cm perspex boxes. A drainage layer of sand was first placed in each box. A 5-cm deep layer of 10% commercial bentonite in sand, mixed with water to form a thick paste, was then placed into the first, control box. In the second box, the sand-bentonite was added in two layers, the first impregnated with $Ca(OH)_2$ and the second impregnated with $MgSO_4$. Protective sand layers and water were then added to the top of each box. Dye added to the top of the control box readily diffused through the sand bentonire liner. Dye added to the top of the second box diffused into the first layer of impregnated sand-bentonite but stopped at the interface with the second layer.

EXAMPLE 11

Application as an additive to plastic liners

In an experiment conducted at the ECN laboratory in two 30×5×20-cm perspex boxes, plastic membranes were placed at the interface between layers of sand containing $Ca(OH)_2$ and $MgSO_4$. The membranes were ruptured prior to placement and the ability of the reagents to repair the rupture was tested. In the first box, intended to simulate a bottom liner, dye was added to the surface and allowed to diffuse to the interface, where it was stopped by the repaired seal. In the second box, intended to simulate a top cover, water was continually dripped onto the upper surface and was stopped by the repaired seal, causing a buildup of water above the seal.

EXAMPLE 12

Application as a seal for the reuse of porous waste materials

In experiments conducted at the ECN laboratory, the potential of the invention for sealing the pores of steel slag and phosphorus slag blocks was assessed. Although these materials are physically well-suited for use as roadbase or in coastal protection, their application is presently restricted because contaminants are released by diffusion through the pores. Uniform cubes were cut from bulk slags and buried in sand containing Mg salts. Parallel experiments without the Mg salts were also set up. After exposure for several weeks, the release of F from phosphorus slag contacted with Mg salts was 10 times less than that from the control. After a similar time, the release of sulphur species from the steel slag contacted with Mg salts was also less than that from the control. Scanning electron microscopy of the blocks exposed to the Mg salts revealed abundant precipitation in the pores.

EXAMPLE 13

Application as a seal for the marine construction with stabilized waste

An experiment was conducted at the ECN laboratory to demonstrate whether seawater could be used as a source of reagents in a particular embodiment of the one-layer method. A model stabilized waste, created by adding radiotracer-labelled $Ca(OH)_2$ to a diffusion tube filled with sand, was submerged in seawater. Subsequent slicing of the tubes revealed that Ca from the tube precipitated upon contact with components from the seawater, creating a partial seal in the pores near the interface.

EXAMPLE 14

Application as a gas-impermeable liner for mine-waste disposal sites

In an experiment conducted at the ECN laboratory, a liner was created by placing a layer of $Ca(OH)_2$ in sand adjacent to a layer of $MgCO_3$ in sand in a perspex box measuring 15×15×3 cm. After an aging period, the box was partially dissected and gas bubbled were injected below the liner. The gas bubbles were unable to penetrate the sealed layer, even when a pressure of 1 kPa was applied.

I claim:

1. A method for sealing off a mass of waste or stabilized waste which comprises:

surrounding the mass of waste, stabilized waste, or its emplacement site with a substantially continuous layer of porous material containing a first reagent, the layer defining one portion of a substantially continuous, waste-encompassing interface;

providing a second reagent, capable of forming a precipitate on reaction with said first reagent, in porous material defining an adjacent portion of said interface;

and causing solvent for the reagents to permeate the porous materials so that the reagents in said adjacent portions diffuse or migrate towards each other to form a precipitate in the pores of said porous material substantially along said interface;

the amount of each reagent being at least such that the pores of said porous material along said interface are filled forming a waste-encompassing layer of reduced permeability at least 100×lower than that of the porous material before sealing or with a diffusivity of a solute through water-filled pores of the material of at least 10×lower than that before sealing.

2. A self healing barrier system for sealing a mass of waste, stabilized waste or an emplacement site comprising:

a homogeneous and porous first unreacted-reactive-reagent-containing material, along an interface with a homogeneous and porous second unreacted-reactive-reagent-containing material, said second reagent being capable of reacting with said first reagent for form a precipitate in the pores of said porous material substantially along said interface;

the amount of each reagent being at least such that the pores of said porous material substantially along said interface can be filled with precipitate forming part of a waste-encompassing barrier interface of reduced permeability at least 100×lower than that of the porous material before sealing or with a diffusivity of a solute through water-filled pores of the sealed material of at least 10×lower than that before sealing; and an intermediate non-porous barrier interface, between said first and second reactive-reagent-containing materials, being comprised of reacted first and second reagents, whereby said barrier system is effective for sealing said waste and is self-healing in case of rupture.

3. A method of sealing off a mass of waste or stabilized waste, or an emplacement site comprising:

surrounding the mass of waste or the emplacement site with a substantially continuous first layer of a first reactive-reagent-containing porous material to said first layer;

placing a second substantially continuous layer of a second reactive-reagent-containing porous material in adjacent relationship to said first layer;

said reagents being selected to be reactive with each other to form at least one precipitate, providing that said layers are impregnated with a liquid in which each said reactive reagent has solubility;

and reacting the reagents of the first and second layers with each other to form a substantially continuous, waste-encompassing non-permeable precipitate interface between said layers.

4. A method as defined in claim 3, wherein at least three adjacent layers of materials are provided, each of said layers containing a reagent capable of reacting with the reagent of the next adjacent layer whereby upon reaction of the reagents in each of the layers at an interface of said layers, non-permeable or reduced permeable interfaces between said adjacent layers are formed, said non-permeable or reduced permeable interfaces comprising a precipitate formed from said reagents.

5. A method as defined in claim 3, wherein said reagents are selected from reagents having ions capable of reacting with the ions of a reagent of an adjacent layer to thereby form at least two different precipitates.

6. A method as defined in claim 3, wherein the reagents are chosen from (a) calcium hydroxide and magnesium carbonate, (b) calcium hydroxide and magnesium sulfate, and (c) calcium hydroxide and magnesium phosphate.

7. A method as defined in claim 3, wherein said reagents are calcium hydroxide and at least one chosen from (a) magnesium carbonate, (b) magnesium sulfate, and (c) magnesium phosphate.

8. A method as defined in claim 3, wherein said reagents are chosen from (a) calcium chloride and sodium carbonate, (b) calcium chloride and potassium carbonate, (c) calcium chloride and sodium phosphate, (d) ferric chloride and industrial slag, and (e) magnesium carbonate and steel slag.

9. A method as defined in claim 3, wherein said porous layers are chosen from materials chemically resistant to said wastes and reagents.

10. A method as defined in claim 9, wherein said porous layers comprise a material chosen from sand, natural soil, clay, cement-bentonite, silts and modified soil materials.

11. A method as defined in claim 10, wherein said soil material is sand-bentonite.

12. A method as defined in claim 9, wherein said porous layers comprise a porous solid material.

13. A method as defined in claim 3, wherein the amounts of said reagents in each of said first and second layers are in excess of the amounts of reagents required to form said interface whereby after the formation of said interface, each of said layers contains unreacted reagents whereby any rupture in a resulting interface layer may be self-healed.

14. A method as defined in claim 3, wherein said porous layers are selected from (a) sand, (b) clay, and (c) stabilized waste.

15. A method as defined in claim 3, wherein the mass of waste is disposed in lagoon, tailings pond or natural waterbody.

16. A self-healing barrier system for sealing a mass of waste or an emplacement site comprising:

a first layer of a first homogenous and porous unreacted reactive-reagent-containing material;

a second layer of a second homogeneous and porous unreacted reactive-reagent-containing material capable of reacting with said first material to form reacted product precipitate constituting an interface layer between said first and second layers; and an intermediate interface barrier between said first and second layers formed of precipitate from a reacted first and second reagents, said barrier system being capable of self-healing upon rupture of said interface due to excess unreacted reagents present on opposite sides of said interface.

17. A barrier as defined in claim 16, wherein said reagents are selected from reagents having ions capable of reacting with the ions of a reagent of an adjacent layer to thereby form at least two different precipitates.

18. A barrier as defined in claim 16, wherein the reagents are chosen from (a) calcium hydroxide and magnesium carbonate, (b) calcium hydroxide and magnesium sulfate, and (c) calcium hydroxide and magnesium phosphate.

19. A barrier as defined in claim 16, wherein said reagents are calcium hydroxide and at least one chosen from (a) magnesium carbonate, (b) magnesium sulfate, and (c) magnesium phosphate.

20. A barrier as defined in claim 16, wherein said reagents are chosen from (a) calcium chloride and sodium carbonate, (b) calcium chloride and potassium carbonate, (c) calcium chloride and sodium phosphate, (d) ferric chloride and industrial slag, and (e) magnesium carbonate and steel slag.

21. A barrier as defined in claim 16, wherein said porous layers are chosen from materials chemically resistant to said wastes and reagents.

22. A barrier layer obtained according to the process of claim 3.

* * * * *